Aug. 2, 1938.　　　K. J. E. HESSELMAN　　　2,125,293
INTERNAL COMBUSTION ENGINE
Filed Dec. 21, 1934　　　3 Sheets-Sheet 1

INVENTOR,
BY
ATTORNEY.

Aug. 2, 1938.    K. J. E. HESSELMAN    2,125,293
INTERNAL COMBUSTION ENGINE
Filed Dec. 21, 1934    3 Sheets-Sheet 2

INVENTOR.
Knut Jonas Elias Hesselman
BY
his ATTORNEY.

Aug. 2, 1938.   K. J. E. HESSELMAN   2,125,293
INTERNAL COMBUSTION ENGINE
Filed Dec. 21, 1934   3 Sheets-Sheet 3
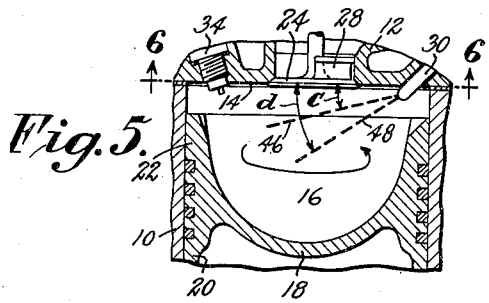
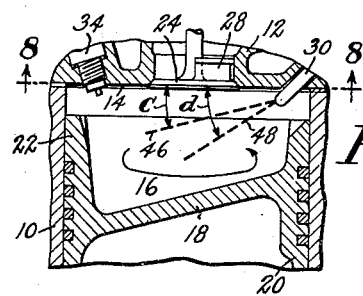
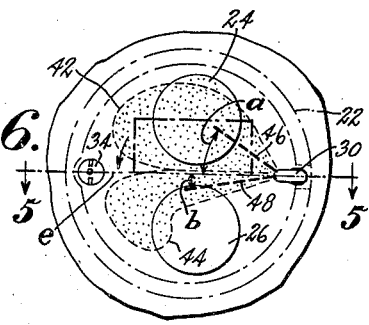
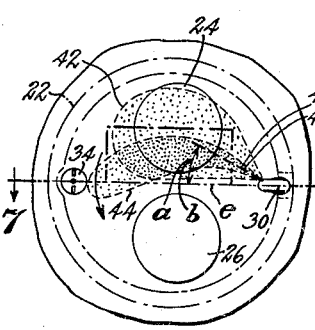
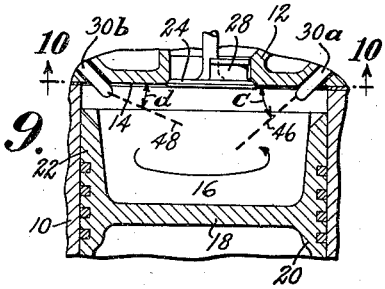
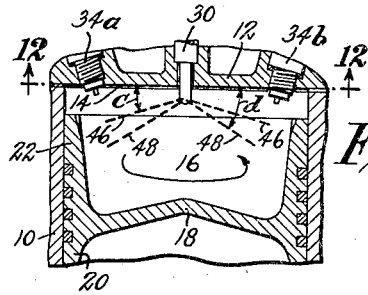
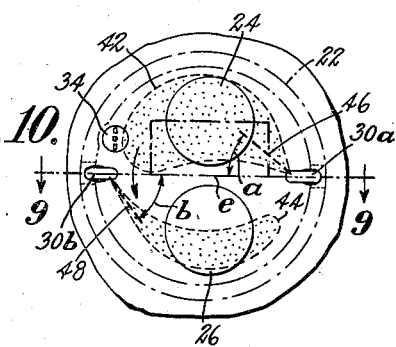
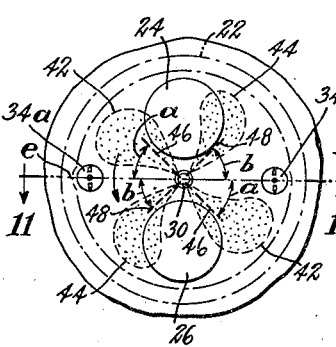
INVENTOR,
BY
his ATTORNEY.

Patented Aug. 2, 1938

2,125,293

UNITED STATES PATENT OFFICE 2,125,293

INTERNAL COMBUSTION ENGINE

Knut Jonas Elias Hesselman, Saltsjo Storangen, Sweden, assignor, by mesne assignments, to Hesselman Motor Corporation, Aktiebolag, Henriksdal, Stockholm, Sweden, a corporation of Sweden Application December 21, 1934, Serial No. 758,543
In Germany December 22, 1933

5 Claims. (Cl. 123—32)

The present invention relates to internal combustion engines of the injection type and more particularly to engines of this type in which the compression ratio is less than that required to produce compression ignition and in which ignition is effected by a timed igniting system. Still more particularly the invention relates to engines of the Hesselman type, operating in accordance with the principles disclosed in U. S. Letters Patent No. 1,835,490.

Generally speaking, it is the object of the present invention to improve upon the characteristics of fuel economy and power output of engines of the above kind, more particularly of high speed engines of the kind referred to.

In engines of the injection type, it is highly desirable, in order to obtain maximum fuel economy and power from a given engine at full load, to arrange for a specific distribution of the injected fuel in the air in the combustion chamber. The amount of power that can be delivered by a given engine is limited by the quantity of air that can be inducted rather than by the amount of fuel that can be injected, and development of maximum power is therefore dependent upon effecting fuel distribution in a way making it possible to fully utilize the air in the combustion chamber to burn fuel. On the other hand, it is also highly desirable, and in fact essential to dependable ignition at part load, that the fuel be injected in a manner such that a fuel-air mixture sufficiently rich in fuel to be readily ignitable is supplied to the vicinity of the ignition device at the time of ignition.

These requisites, coupled with the fact that because fuel is injected late in the compression stroke in this type of engine the time element for forming a fuel charge prior to ignition is extremely short, make the problem of providing the desired character of charge under all conditions exceedingly difficult.

Heretofore the problem has been solved to the extent of providing commercially practical engines by introducing fuel in a plurality of jets into a rotating air charge, but I have discovered that the performance of a given engine, both as to fuel economy and as to maximum power output, can be and is materially improved by injecting fuel in accordance with the principles of the present invention as hereinafter explained.

I have found that different specific variations of the method of and means for injection must be employed with engines of the kind set forth.

There are two main factors which are variable and which appear to control the distribution of the fuel and the positioning of any given fuel cloud at the moment of ignition, these factors are the character or form of the jet with respect to its velocity and dispersion, and the angle of injection with respect to the surface of the head of the combustion chamber. Naturally, a jet having high linear velocity and relatively little dispersion will have a greater penetrative effect than one of less linear velocity and/or greater dispersion and for the purposes of the present specification I shall refer generally to the characteristics determinative of penetration as the factor of penetration of the jet. In many cases, it has been found sufficient to provide for different penetrative effects, in other cases the angles of injection were deciding whereas in still other cases the best results were obtained by a combination of jets with different penetration and angles.

In accordance with my invention fuel is injected into a rotating air charge in a plurality of jets of different initial directions which directions may be more or less inclined with respect to the axis of the cylinder, and more or less coincident with the direction of air rotation, or even facing same. The jets injected in directions mostly coincident with the direction of air rotation, and from what may be termed downstream jets, are generally injected with a factor of penetration resulting in greater dispersion and less penetrative effect respectively, than jets the general direction of which is not as much coincident with, or against the rotational movement of the air in the combustion chamber. The spray of fuel of a sufficiently weak jet will secure an excellent penetration and saturation of the air flowing in substantially the same direction as the fuel. Thus, too much dispersion as well as impinging on the wall of the combustion chamber is avoided.

I have, further, found in many cases that it will be useful to inject fuel into a rotating air charge in a plurality of jets in a manner such as to produce a readily ignitable cloud of fuel which is in the vicinity of the igniter at the moment of ignition, which jets forming an ignition cloud may be termed ignition jets. In most of the practical cases the ignition jet is arranged to be a downstream jet with relatively great dispersion and little penetrative effect.

All other jets not being downstream and/or ignition jets as herebefore referred to, may be termed auxiliary fuel jets.

The following considerations have a material bearing on the action which takes place, and are, I believe, largely determinative of the reasons why the variables must be varied in the way I have found to be the case in order to secure the desired results. When a rotating air charge is provided in an engine cylinder, the general plane of rotation of the air during the latter portion of the compression stroke (corresponding to the period of injection) is normal to the axis of reciprocation of the piston, and the rotative movement is accompanied by movement of the air axially of the cylinder at different velocities in different portions of the combustion chamber. Thus, in addition to rotating, the air adjacent to the piston head moves upwardly during the injection period at substantially the same velocity as that of the piston, while the air adjacent to the combustion chamber head has no upward movement during this period. Furthermore, the general tendency of the rotating air appears to be to turn or deflect upwardly a jet injected at a downward angle in a direction with the direction of air rotation and to turn or deflect downwardly and backwardly under itself a jet injected at a downward angle against the direction of rotation. The amount of upward or downward deflection of a given jet by the rotating air will depend to a large extent upon the angle of injection and with a given angle upon the factor of penetration of the jet, and, furthermore, upon the speed of rotation of the air charge as well as of the speed of the piston in the cylinder. Thus, with respect to application of my invention to engines of the kind set forth it must be kept in mind that the time interval between the beginning of injection and occurrence of ignition is fairly short. Therefore, if a cloud sufficiently rich in fuel and readily ignitable must be rapidly formed in the vicinity of the ignition device, this can be obtained by injecting fuel in the direction of the rotating air and with a high degree of dispersion (downstream ignition jet). On the other hand, the auxiliary jet or jets when injected, as usual, in directions more facing the rotating air than a downstream ignition jet but with the same relatively low force of penetration as an ignition jet, would be dispersed so violently by the opposing air that the possibility of penetrating and saturating the remaining air not impregnated by the ignition jet, would be jeopardized. According to my invention the auxiliary fuel jets are, therefore, injected with a stronger penetrating force than the downstream or ignition jets.

Instead of or in addition to the specific variation in the factors of penetration and/or dispersion, the angle of injection can be varied and made different in regard to downstream or ignition jets on the one hand, and auxiliary jets on the other hand. Since, among other things, the direction of a fuel jet opposing the direction of air rotation, and the speed of this rotation have great influence on the dispersion of a jet it will be understood that a difference in the angles of injection can be sufficient for the purposes set forth.

Having in mind the foregoing considerations, a better understanding of the manner of application of the invention to engines of different proportion may be had from a consideration of the following description of engines of different proportion illustrated by way of example in the accompanying drawings in which:

Figs. 5–12 illustrate further embodiments of the invention applicable to engines of the kind set forth.

Figure 1:
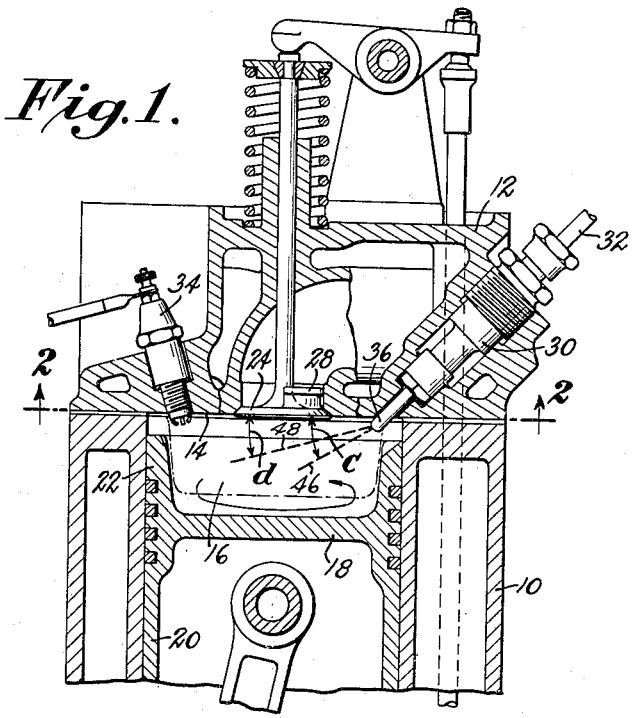
Fig. 1 is a vertical section taken on the line 1—1 of Fig. 2 and showing the combustion chamber of one engine embodying the invention.
Figure 2:
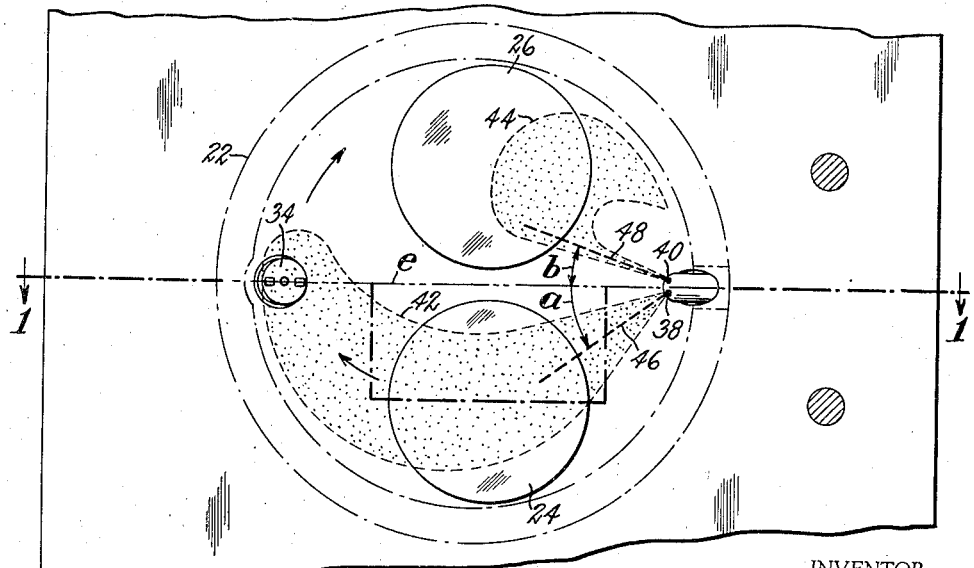
Fig. 2 is a section taken on the line 2—2 of Fig. 1.

Referring now more particularly to Figs. 1 and 2, the cylinder 10 is provided with the usual detachable head 12, the lower face 14 of which provides the head of the combustion or compression space 16. The bottom of the compression space is formed by the head 18 of piston 20, which, in the form of engine illustrated, is provided with an upstanding peripheral flange 22, the top of which reaches substantially to the head of the combustion chamber at the end of the compression stroke. The cylinder head 12 carries the usual inlet and exhaust valves 24 and 26 respectively, cam actuated through the medium of the conventional push rods and rocker arms.

Air is admitted to the cylinder on the intake stroke of the piston in generally tangential direction so as to produce a rotary movement of the air during this stroke. The manner in which tangential admission of air is effected may vary within the scope of the invention. In the present embodiment such tangential admission is indicated as being effected by means of a semicircular skirt or shroud 28 on the inlet valve 24, which serves to mask a part of the valve opening and to direct air into the cylinder so as to give rotation in the direction indicated by the arrow in Fig. 2. Fuel is injected into the combustion chamber from adjacent the periphery thereof through a fuel injection nozzle indicated generally at 30, to which fuel is supplied at suitably timed intervals through the fuel supply pipe 32. Any suitable means for supplying fuel at properly timed intervals may be employed, and the timing is such that the fuel is injected during the latter portion of the compression stroke.

Ignition is effected by a suitably timed ignition device which in the embodiment illustrated is in the form of a high tension spark plug 34, forming a part of the conventional electrical ignition system and providing for timed ignition, the timing of which is advantageously made variable in accordance with speed of operation of the engine, as in the case of similar ignition systems employed with gasoline engines. The nozzle tip 36 of the injection nozzle may advantageously be of the kind disclosed in U. S. Pat. No. 1,888,082 granted to me on Nov. 15th, 1932, and in the embodiment illustrated is provided with two orifices indicated at 38 and 40 in Fig. 2. Orifice 38 serves to inject what may be termed the ignition jet, the outline of which is indicated generally by the dotted line 42, while the orifice 40 injects a similar jet the outline of which is indicated at 44.

As will be observed from Fig. 2, the jets are injected from substantially the periphery of the combustion chamber and along lines constituting chords of the circular cross-section of the combustion chamber. In the plane normal to the axis of the cylinder, which plane may be considered as the plane of rotation of the air, the jets are directed along different chords, the center lines 46 and 48 of the jets 42 and 44 forming angles $a$ and $b$ respectively with the diameter $e$ of the cylinder, which angles, for convenience, I will refer to as angles of divergence. The nozzle orifices are formed so as to provide jets having different factors of penetration. In addition to this difference the center lines of the jets or sprays may also be inclined with respect to the combustion chamber head formed by the surface 14. The center line as here referred to, is the line of the center of gravity of the jet or spray when injected by the nozzle into stationary air. As will be observed from Fig. 1, the two jets are inclined at different angles $c$ and $d$, with respect to a plane normal to the axis of the cylinder, which angles will hereinafter be referred to as the angles of inclination of the jets.

In the embodiment illustrated, the large angle $c$ is the angle of inclination of the ignition jet and the smaller angle $d$ is the angle of inclination of the auxiliary jet.

In the engine illustrated, it is further to be noted that the shape of the combustion chamber in vertical cross-section is such that the chamber is comparatively shallow in relation to its diameter.

Figure 3:
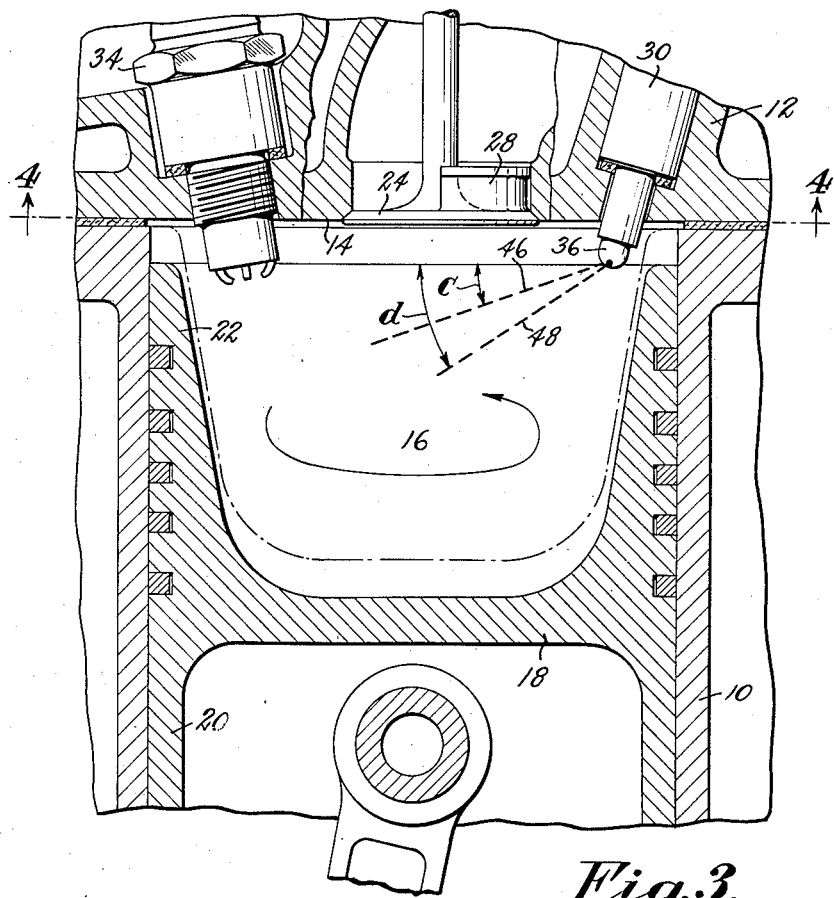
Fig. 3 is a section similar to Fig. 1 illustrating the application of the invention to an engine having a combustion chamber of different proportion than that shown in Fig. 1.
Figure 4:
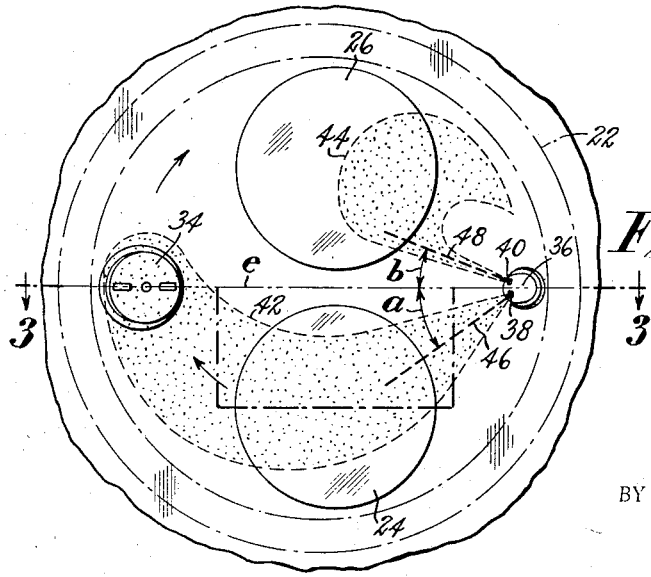
Fig. 4 is a section taken on the line 4—4 of Fig. 3.

Turning now to the engine cylinder illustrated in Figs. 3 and 4, the general arrangement of the parts is similar to that already described and need not be again described in detail. Similar parts and angles are designated by similar reference characters. The principal difference between the cylinder shown in these figures and that shown in Figs. 1 and 2 is that in the present instance the combustion chamber is deeper in cross-section relative to its mean diameter than the combustion chamber shown in the previously described embodiment, and in the present embodiment the angle of inclination of the ignition jet and the angle of inclination of the auxiliary jet are different relative to each other from those in the previously described apparatus. In the present instance, the angle $c$ of the ignition jet is smaller than the angle $d$ of the auxiliary jet in order to secure the rapidly forming of the ignition cloud in the vicinity of the ignition device.

I have described the two foregoing arrangements in order to illustrate my discovery of a peculiar condition which exists in engines of this kind, and which I find must be taken into account if the best results are to be obtained.

I have found that the desired object of providing an ignition fuel cloud at the ignition device and one or more auxiliary fuel clouds in other portions of the combustion chamber, is best obtained by making the factors of penetration of an ignition jet less than the factor of an auxiliary jet. The factor of penetration of a jet may obviously be varied readily by changing the characteristics of the injection nozzle and in the case of a nozzle of the kind disclosed in U. S. Pat. No. 1,888,082 previously referred to, the factor of penetration of a jet may readily be varied by varying the depth and/or diameter of the nozzle orifice from which the jet issues. Such factor can be ascertained in many ways, one of which was disclosed by Robertson Matthew (Power, vol. 62, 1925, page 567).

When the ratio of the depth of the combustion chamber (at the end of the compression stroke) to the mean diameter of the combustion chamber is within a range of values of which the upper limit is of the order of 0.75 I have found it advantageous to arrange for a difference in the angles of inclination so that the angle of an ignition jet is greater than the angle of an auxiliary jet. This relationship of the angles of inclination of the jets, however, I have further determined does not hold good for best results when the ratio exceeds this value, and I have further found that when the ratio exceeds this value, the best results are obtained by reversing the relation of the angles of inclination so that the angle of inclination of the ignition jet is less than the angle of inclination of the auxiliary jet.

In order to further illustrate the application of the invention, the following examples of engines which I have tested and found to provide highly satisfactory results, may be taken as characteristic of the application of the invention to engines of different combustion chamber proportion.

In an engine of the kind shown in Fig. 1, having a relatively shallow combustion or compression space, with bore and stroke of 105 and 136 millimeters respectively and compression ratio of about 6 to 1, and in which the mean height of the compression space and the mean diameter of this space are 45 and 81 millimeters respectively, giving a ratio of about 0.56, the angles of the jets are as follows: the angle of divergence of the ignition jet is about 28° and the angle of inclination of this jet is about 25°. The angle of divergence of the auxiliary jet is about 28° and the angle of inclination of this jet is about 18°. In this instance, the auxiliary jet has a factor of penetration substantially greater than the factor of the ignition jet.

In the arrangement illustrated in Figs. 3 and 4, where the combustion chamber is relatively deep, a test engine having a bore of 127 and a stroke of 146 millimeters and having the same compression ratio, with a height of compression space of 64 millimeters and a mean diameter of this space of 85 millimeters, giving a ratio of 0.75, has provided the desired results with the following arrangement of jets. The angle of divergence of the ignition jet is 30° and the angle of inclination 18°. The angle of divergence of the auxiliary jet is 20° and the angle of inclination of this jet 28°. In this instance, the values of the factor of penetration of the two jets are arranged to be very different, so that the auxiliary jet has a much greater factor of penetration than the ignition jet.

Generally speaking, it may be said that the ignition jet should have a factor of penetration less than the factor of penetration of the auxiliary jet, and the reason for this will be more or less evident from a consideration of Fig. 4, for example. From this figure it will be evident that the ignition jet travels generally in the direction of air rotation, and consequently can be expected to penetrate further into the combustion chamber with a given factor of penetration than will the auxiliary jet, the direction of which is generally facing the direction of air rotation. The desirability of a high factor of penetration of the auxiliary jet is particularly apparent in the case of combustion chambers of relatively great depth, in order that the auxiliary jet may have sufficient penetrative action to get the desired fuel cloud into the lower strata of the air in the combustion chamber.

From the foregoing examples, it will be evident that the desired objects of the invention are attained by providing clouds of fuel from different jets in different portions of the air charge, and although with combustion chambers of different proportion the relation of the angles of inclination of the different jets changes, the result obtained is that the fuel cloud from the downstream jet which is a downstream ignition jet in the embodiments shown by Figs. 1-4, is produced in a position such that a readily ignitable mixture forming a part of this fuel cloud is in the vicinity of the ignition device at the time of ignition, while the fuel cloud resulting from the auxiliary jet is disposed at least in part in the lower portion of the combustion chamber. Initial combustion is effected of the fuel in the ignition fuel cloud, and the flame propagation resulting from this combustion travels through this cloud and also the cloud of auxiliary fuel without interruption. The distribution of the fuel clouds in the combustion chamber is such that a maximum proportion of the available air in the combustion chamber is utilized for the combustion of all of the fuel that is injected.

While in some instances I have found that the good results are obtained with different angles of inclination for the different jets, the invention is not limited to the use of different angles of inclination, but may be made use of in certain instances with jets having angles of inclination which are equal. From the fact that with a shallow combustion chamber the best results are obtained with a larger angle of inclination for the ignition jet than for the auxiliary jet, and that with a rather deep combustion chamber best results are obtained with a smaller angle of inclination for the ignition jet than for the auxiliary jet, it would logically appear that with an engine having a combustion chamber of what may be termed intermediate height, the angles of inclination of the jets might best be approximately equal. In this instant, the desired results will be obtained by utilizing different factors of penetration for the downstream jets and the auxiliary jets.

In the various forms of combustion chambers fragmentarily illustrated by Figs. 5-12 numeral references corresponding to those in Figs. 1-4 signify similar parts.

Fig. 5 shows an engine with hemispherical compression space. Air is admitted in a generally tangential direction through inlet valve 24 so as to produce a rotary movement of the air in the cylinder. Fuel is injected into the combustion chamber from a point adjacent to the periphery thereof through the nozzle 30. The downstream ignition jet is injected at an angle of inclination somewhat smaller than the angle of inclination of the auxiliary jet. The factor of penetration is less for the downstream jet. The angle of divergence may be relatively large for the downstream jet and small for the auxiliary jet which is directed towards the lower part of the hemispherical piston head. Timed ignition is secured by the spark plug 34 located in the cylinder head.

The piston of an engine according to Fig. 7 has an inclined bottom, thus providing for a truncated combustion chamber. The spark plug 34 is disposed where the combustion chamber is of greater depth. Air is admitted though valve 24 in tangential direction. The angle of inclination is smaller for one jet than for the other jet. Both jets are directed along chords at one side of the diameter e in the direction of the air rotation. At the end of the compression stroke, air flows from the more shallow to the deeper part of the combustion chamber. The ignition cloud is formed by the weaker ignition jet in the recess, above the cloud formed by the auxiliary jet. This arrangement will be most useful with high speed short stroke engines. It is obvious that the arrangement of the jets with respect to the diameter e, as shown in Figs. 2, 6, and 8 could be applied to each of the engines as illustrated by Figs. 1, 3, 5, and 7.

Figs. 9 and 10 illustrate an engine similar with Fig. 1. Two nozzles 36, are disposed on the periphery of the combustion chamber, fuel is injected by the nozzles in the direction of air rotation but at different angles of inclination and with different factors of penetration. The ignition jet is injected by the nozzle 30a located opposite the igniter 34. In the present instance the greater penetrative effect of the auxiliary jet is more important than a difference in the angles of injection.

Figs. 11 and 12 show an engine with a nozzle located in or at the axis of the cylinder, between the inlet and outlet valve 24, and 26 respectively. Two spark plugs 34 are inserted at the periphery of the combustion chamber. Two ignition jets are injected into the rotating air charge with greater dispersion and smaller angles of injection than the two auxiliary jets.

The specific factors of penetration and the specific angles of inclination of the jets may vary considerably within the scope of the invention in order to suit the requirements of individual engines.

While for purposes of illustration and example I have shown and described my invention as applied to engines having one particular arrangement of fuel injection and ignition apparatus, it is to be understood that the invention is not limited to the specific forms of apparatus shown, but may embrace all forms of apparatus and all modes of operation falling within the scope of the appended claims when they are construed as broadly as is consistent with the state of the prior art.

What I claim is:

1. In an internal combustion engine of the injection type having a cylinder, means providing a combustion chamber, means for introducing an air charge into said chamber and causing rotation of the air about the axis of the cylinder, a timed ignition device for igniting a fuel charge in said chamber, and means located in said chamber for injecting fuel thereinto in a plurality of jets including an ignition jet and a separate auxiliary jet, said ignition jet being directed into the combustion chamber in a direction inclined with respect to a plane normal to the cylinder axis and with a factor of penetration causing the rotating air to carry fuel from said ignition jet to the vicinity of said ignition device at the time of ignition and said auxiliary jet being directed into the combustion chamber in a direction having a different angle of inclination with respect to said plane than that of said ignition jet and with a different factor of penetration for causing fuel from the auxiliary jet to form a fuel cloud in a different part of the combustion chamber than that impregnated by the fuel from said ignition jet.

2. In an internal combustion engine of the injection type having a cylinder, means providing a combustion chamber, means for introducing an air charge into said chamber and causing rotation of the air about the axis of the cylinder, a timed ignition device for igniting a fuel charge in said chamber, and means located in said chamber for injecting fuel thereinto in a plurality of jets including an ignition jet and a separate auxiliary jet, said ignition and auxiliary jets being directed into the combustion chamber at different angles of divergence with respect to a plane containing the cylinder axis, said ignition jet being directed into the combustion chamber in a direction inclined with respect to a plane normal to the cylinder axis and with a factor of penetration causing the rotating air to carry fuel from said ignition jet to the vicinity of said ignition device at the time of ignition and said auxiliary jet being directed into the combustion chamber in a direction having a different angle of inclination with respect to said plane than that of said ignition jet and with a different factor of penetration for causing fuel from the auxiliary jet to form a fuel cloud in a different part of the combustion chamber than that impregnated by the fuel from said ignition jet.

3. In an internal combustion engine of the injection type having a cylinder, means providing a combustion chamber, means for introducing an air charge into said chamber and causing rotation of the air about the axis of the cylinder, a timed ignition device for igniting a fuel charge therein, and means located in said chamber for injecting fuel thereinto in a plurality of jets including an ignition jet and a separate auxiliary jet, said ignition jet being directed into the combustion chamber in the general direction of rotation of the air and inclined with respect to a plane normal to the cylinder axis and with a factor of penetration causing the rotating air to carry fuel from said ignition jet to the vicinity of said ignition device at the time of ignition, and said auxiliary jet being directed into the combustion chamber in a direction generally facing the direction of rotation of the air and having a different angle of inclination with respect to said plane than that of said ignition jet and with a different factor of penetration for causing fuel from the auxiliary jet to form a fuel cloud in a different part of the combustion chamber than that impregnated from the fuel from said ignition jet.

4. In an internal combustion engine of the injection type having a cylinder, means including a piston providing a combustion chamber when the piston is at top dead center having a ratio between the mean height of the combustion chamber and the mean diameter thereof the upper limit of which is of the order of 0.75, means for introducing an air charge into said chamber and causing rotation of the air about the axis of the cylinder, a timed ignition device in said chamber for igniting a fuel charge therein, and means for injecting fuel into said chamber in a plurality of jets, said means including a first jet orifice offset from said axis for injecting an ignition jet of fuel in the general direction of rotation of the air and inclined with respect to a plane normal to the cylinder axis and with a factor of penetration causing the rotating air to carry fuel from said ignition jet to the vicinity of said ignition device at the time of ignition, and a second jet orifice offset from said axis for injecting a separate auxiliary jet of fuel into said chamber in a direction generally facing the direction of the rotation of the air with a smaller angle of inclination with respect to said plane and with a greater factor of penetration than said ignition jet.

5. In an internal combustion engine of the injection type having a cylinder, means including a piston providing a combustion chamber when the piston is at top dead center having a ratio between the mean height of the combustion chamber and the mean diameter thereof, the lower limit of which is of the order of 0.75, means for introducing an air charge into said chamber and causing rotation of the air about the axis of the cylinder, a timed ignition device in said chamber for igniting a fuel charge therein, and means for injecting fuel into said chamber in a plurality of jets, said means including a first jet orifice offset from said axis for injecting an ignition jet of fuel in the general direction of rotation of the air and inclined with respect to a plane normal to the cylinder axis and with a factor of penetration causing the rotating air to carry fuel from said ignition jet to the vicinity of said ignition device at the time of ignition, and a second jet orifice offset from said axis for injecting a separate auxiliary jet of fuel into said chamber in a direction generally facing the direction of the rotation of the air with a greater angle of inclination with respect to said plane and with a greater factor of penetration than said ignition jet.

KNUT JONAS ELIAS HESSELMAN.